United States Patent [19]

Vogel et al.

[11] 4,091,076

[45] May 23, 1978

[54] METHOD OF REMOVING SULFUR EMISSIONS FROM A FLUIDIZED-BED COMBUSTION PROCESS

[75] Inventors: Gerhard John Vogel; Albert A. Jonke, both of Elmhurst; Robert B. Snyder, Naperville, all of Ill.

[73] Assignee: The United States of America as represented by the United States Department of Energy, Washington, D.C.

[21] Appl. No.: 684,419

[22] Filed: May 7, 1976

[51] Int. Cl.² .......................... B01J 8/00; C01B 17/00; B01J 23/08; C09K 3/00

[52] U.S. Cl. ................................ 423/244; 252/190; 252/463

[58] Field of Search .............................. 423/242–244; 252/463, 190

[56] References Cited

U.S. PATENT DOCUMENTS

| 931,515 | 8/1909 | Sprague | 423/244 |
|---|---|---|---|
| 2,698,305 | 12/1954 | Plank et al. | 252/463 |
| 2,992,884 | 7/1961 | Bienstock et al. | 423/244 |
| 3,070,639 | 12/1962 | Geerts et al. | 252/463 |
| 3,411,865 | 11/1968 | Pijpers et al. | 423/244 |

FOREIGN PATENT DOCUMENTS

| 1,154,009 | 1969 | United Kingdom | 423/244 |

OTHER PUBLICATIONS

Alumina Properties, Russell et al., 1956, p. 37.

*Primary Examiner*—O. R. Vertiz
*Assistant Examiner*—Gregory A. Heller
*Attorney, Agent, or Firm*—Dean E. Carlson; Frank H. Jackson; Hugh W. Glenn

[57] ABSTRACT

Alkali metal or alkaline earth metal oxides are impregnated within refractory support material such as alumina and introduced into a fluidized-bed process for the combustion of coal. Sulfur dioxide produced during combustion reacts with the metal oxide to form metal sulfates within the porous support material. The support material is removed from the process and the metal sulfate regenerated to metal oxide by chemical reduction. Suitable pore sizes are originally developed within the support material by heat-treating to accommodate both the sulfation and regeneration while still maintaining good particle strength.

4 Claims, 2 Drawing Figures

METHOD OF REMOVING SULFUR EMISSIONS FROM A FLUIDIZED-BED COMBUSTION PROCESS

CONTRACTUAL ORIGIN OF THE INVENTION

The invention described herein was made in the course of, or under, a contract with the U.S. Energy Research and Development Administration.

BACKGROUND OF THE INVENTION

This invention relates to sulfur dioxide removal from fluidized-bed combustion processes. It is of particular interest in respect to the fluidized-bed combustion of coal, but processes for the combustion of other sulfur-containing materials such as coke, char, wood and combustible waste from industrial, commercial or residential sources might also incorporate the present method.

Previous methods for removing sulfur dioxide from conventional boilers have included fixed-bed reactors through which effluent gases are passed. Such reactors have included a wide range of metal oxides supported on such as alumina substrates. However, in a high-temperature, fluidized-bed combustion unit, these methods are of limited utility as it is desirable to pass the high-temperature gas directly to a gas turbine or other device for the generation of electricity. Therefore, materials such as limestone or dolomite have been fluidized with the coal or other fossil fuel to react with sulfur dioxide and form sulfates. The sulfated limestone or dolomite is then removed from the combustion process and regenerated by fluidization within a reducing gas such as hydrogen, carbon monoxide or methane. Unfortunately, only a portion of the dolomite or limestone sulfates and then only a portion of that sulfated is regenerated to the oxide. Consequently, the reactivity of these materials decreases with each sulfation-regeneration cycle. Also, severe decrepitation of the limestone or dolomite particles occurs during regeneration to produce fines that are not easily retained within the fluidized-bed combustion process.

Therefore, in view of these disadvantages of the prior art, it is an object of the present invention to provide an improved method for removing sulfur dioxide emissions produced in a fluidized-bed combustion process.

It is a further object to provide such a method of sulfur dioxide removal in which materials sulfated within the fluidized bed can be regenerated with reduced decrepitation.

It is a further object to provide a method of preparing particles of support material impregnated with a metal oxide for removal of sulfur dioxides within a fluidized-bed combustion process.

SUMMARY OF THE INVENTION

In accordance with the present invention, sulfur dioxide is removed from a fluidized-bed combustion process by reaction with an alkali metal oxide or alkaline earth metal oxide such as calcium oxide, strontium oxide, barium oxide, magnesium oxide, sodium oxide or potassium oxide. The metal oxide sorbent is impregnated within a porous and refractory support material of such as alumina, silica, titania, zirconia or compositions of these materials.

The invention also comprehends a method of preparing particles of a support material impregnated with a metal oxide for use in a fluidized-bed combustion process to remove sulfur dioxide. The method includes heat-treating the support material to a temperature not less than 1200° C. and thereby producing pore diameters in exess of 0.2 micrometer in a major portion of the pore volume. Then the support material is contacted with a nitrate solution of the metal and heated with impregnated nitrate solution to a sufficient temperature to form the metal oxide within the porous volume of the support material.

DETAILED DESCRIPTION OF THE DRAWINGS

DETAILED DESCRIPTION OF THE PREFERRED EMBODIMENT

Figure 1:
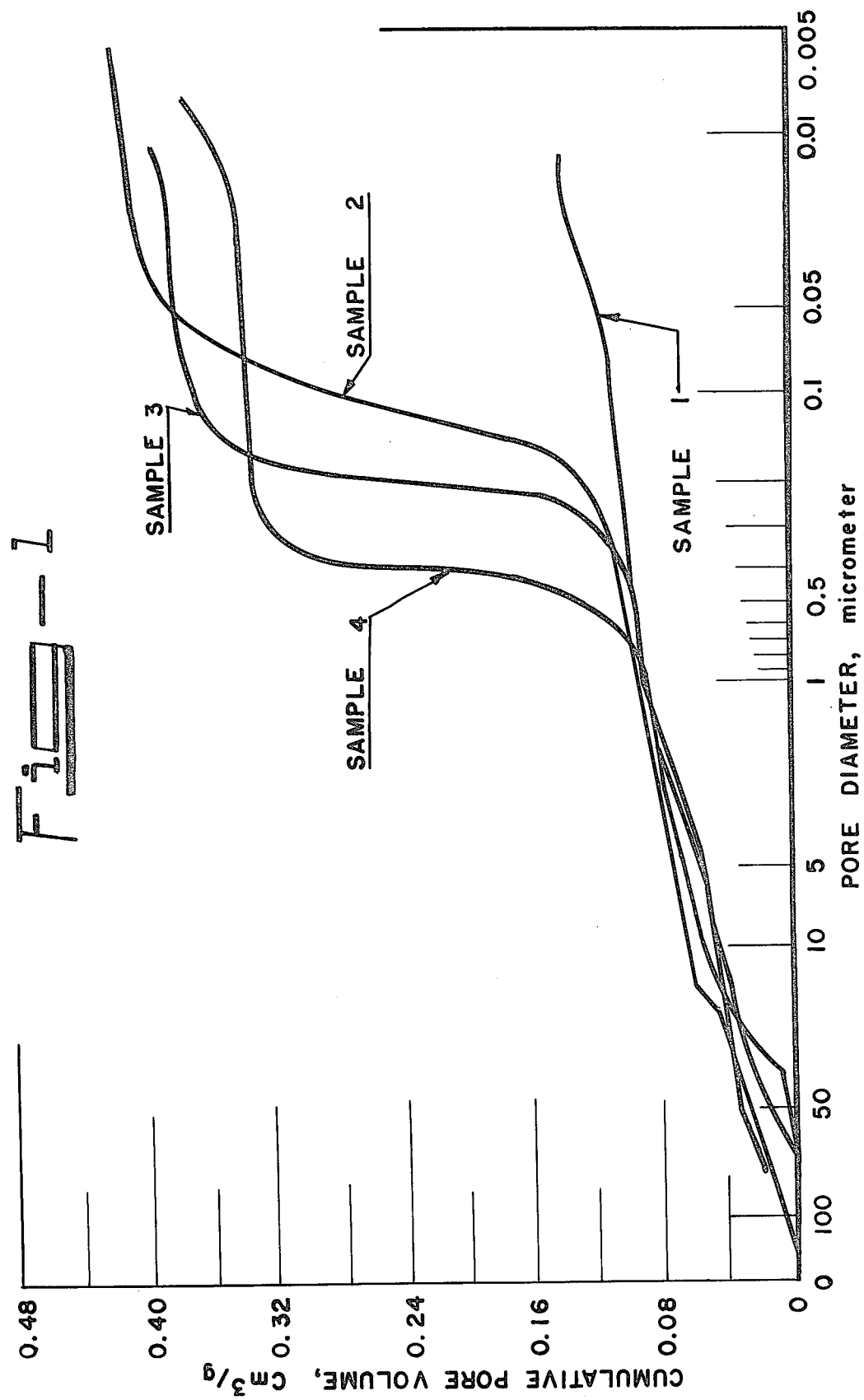
FIG. 1 is a graph showing the relationship of cumulative pore volume to pore diameter for aluminum oxide material subjected to various heat-treating temperatures.

In a preferred manner of preparing particles for use in a fluidized-bed combustion process for the removal of sulfur dioxide gas, a refractory support material is obtained with the desired pellet or particle characteristics. Refractory materials such as alumina, silica, zirconia, titania and compositions of these can be selected for use as the support. The compositions may be physical mixtures or aluminates, silicates, zirconates and titanates of these and other constituents. Into this support material is impregnated a sorbent consisting of a selected metal oxide for reaction with $SO_2$ gas. Alkali metal oxides and alkaline earth metal oxides such as $Na_2O$, $K_2O$, CaO, BaO, MgO, SrO are suitable sorbent materials. Lithium oxide has been found unsuitable for use because its sulfate decomposes at combustion conditions (e.g. 900° C.)

Support material pellets or particles of about 1 to 10 mm diameter and length are contemplated. Such particles will have an overall porosity of about 20 to 40% of the total volume and with a major portion of that volume having pore diameters in excess of about 0.2 micrometer. As will be seen hereinbelow, pore sizes of that diameter and larger are advantageously provided in alumina support materials containing calcium oxide sorbent. Particles having a major portion, that is over 50%, of their pore volume in excess of this pore size can be obtained by heat-treating at temperatures of about 1200° to 1500° C. for a period of time in excess of about 4 hours.

These refractory particles are then immersed in a solution of metal nitrate and refluxed for a sufficient period of time, e.g. 4 to 8 hours at about 100° C., to obtain even distribution of nitrate solution in the particles of refractory material. The metal nitrate concentration can be varied to vary the weight percent of metal oxide subsequently formed within the support material. For example, solutions of calcium nitrate having about 1 to 6 weight ratio $Ca(NO_3)_2 \cdot 4H_2O$ to $H_2O$ can be used to impregnate typical alumina pellets with 6 to 12% CaO by weight respectively.

The pellets filled with nitrate solution are removed and heated to evaporate the water and decompose the metal nitrate to the corresponding oxide. Temperatures of about 380° to 600° C. are suitable for this purpose. However, a higher temperature about to 1100° C. is used to further heat-treat the refractory support material and bind the metal oxide into the support material as an aluminate, silicate, etc. Heat treatment as described herein for pore size development can be performed at this point rather than prior to filling the support with nitrate solution provided sufficient porosity is initially available to incorporate the desired quantity of metal nitrate.

Although the above-described method is advantageously employed to obtain even distribution of metal oxide within the refractory support material along with the desired pore size distribution, other techniques might also be employed. As an example, molten nitrates such as calcium nitrate can be impregnated into and decomposed within the porous refractory material. Insoluble metal carbonates such as $CaCO_3$ might be preferentially precipitated within the porous volume of the pellet after previously saturating it with a more soluble carbonate solution, e.g. $Na_2CO_3$. Still other techniques might involve the precipitation of metal sulfates within the porous pellets with subsequent regeneration to the metal oxides.

Particles or pellets containing the selected metal oxides, that is one or more of the oxides of the alkali and alkaline earth metals, sodium, potassium, calcium, strontium, barium and magnesium, are introduced into a fluidized-bed combustion process in which a particulate fossil fuel such as coal or other combustible material is fluidized within a flowing oxygen-containing gas stream. Combustion temperatures of 900° C. and above are contemplated. Fluidized-bed combustion processes of this type are fully described in Vogel et al., "A Development Program on Pressurized Fluidized Bed Combustion," Annual Report for Period July 1, 1974—June 30, 1975, ANL/ES-CEN-1011. Merely by way of example, coal particles of less than about 1.4 mm size are injected into a fluidized bed of support particles with $SO_2$ sorbent. Air at a velocity of about 4 feet per second is passed through the bed and combustion occurs to produce hot exhaust gases. These high-temperature gases may be used to drive a turbine or MHD device for generating electricity along with subsequent production of steam.

The metal oxides contained within the refractory support particles employed in such a process react with sulfur dioxide gas produced during combustion to form metal sulfates deposited within the support materials. Pellets containing metal oxides can be continuously fed into the process and a corresponding quantity of reacted pellets removed for regeneration.

Regeneration of the metal sulfates within the pellets is formed in a fixed or fluidized bed with a reducing gas such as carbon monoxide, hydrogen or methane. The reducing gas is carried at a concentration of about 1 to 6 volume % in an inert diluent such as nitrogen passing over the pellets. The gas is maintained at a temperature of about 1000° to 1200° C. as substantial amounts of metal sulfides can be formed from the sulfates at temperatures below about 1000° C. At the higher temperatures, the metal sulfate is often regenerated to a metal aluminate, zirconate, etc. depending on the refractory support material. These composite oxides have also been found to be suitable sorbents for reacting with $SO_2$ for its removal.

In order to demonstrate the effect of pore size on one specific embodiment of the invention, several samples of boehmite, that is AlO(OH), were subjected to different heat-treating temperatures before being impregnated with a sorbent, calcium oxide, followed by being sulfated with $SO_2$ gas. The first sample was not subjected to heat-treatment but was employed as boehmite, while the other three samples were heat-treated for about 8 hours at 1100°, 1200° and 1500° C., respectively. Following the heat-treatment, each sample was refluxed in a 55 weight % calcium nitrate aqueous solution for about 6 hours and then heated to approximately 1100° C. to decompose the calcium nitrate to calcium oxide sorbent within the refractory alumina support material. Table I, given below, shows the original heat-treating step temperature along with the weight % calcium oxide impregnated into the support material.

TABLE I

| Sample | Support Material | Heat-Treatment Temp. ° C. | CaO wt. % |
|---|---|---|---|
| 1 | Boehmite | None | 1.2 |
| 2 | $\alpha\ Al_2O_3$ | 1100 | 8.8 |
| 3 | $\alpha\ Al_2O_3$ | 1200 | 12.5 |
| 4 | $\alpha\ Al_2O_3$ | 1500 | 11.4 |

FIG. 1 gives the cumulative pore volume in $cm^3$ per gram of support material as a function of pore diameter. Each diameter on these curves corresponds to the cumulative pore volume having pores of that particular pore diameter or larger. It is seen from FIG. 1 that sample 4 which was heat-treated to 1500° C. has pore diameters of 0.2 micrometers and larger for more than about 80% of its pore volume. Sample 3, heat-treated at 1200° C., has somewhat over 50%, that is a major portion, of its pore volume due to pores with diameters larger than 0.2 but sample 2, heat-treated at 1100° C., has only about 30% of its pores over that size.

Figure 2:
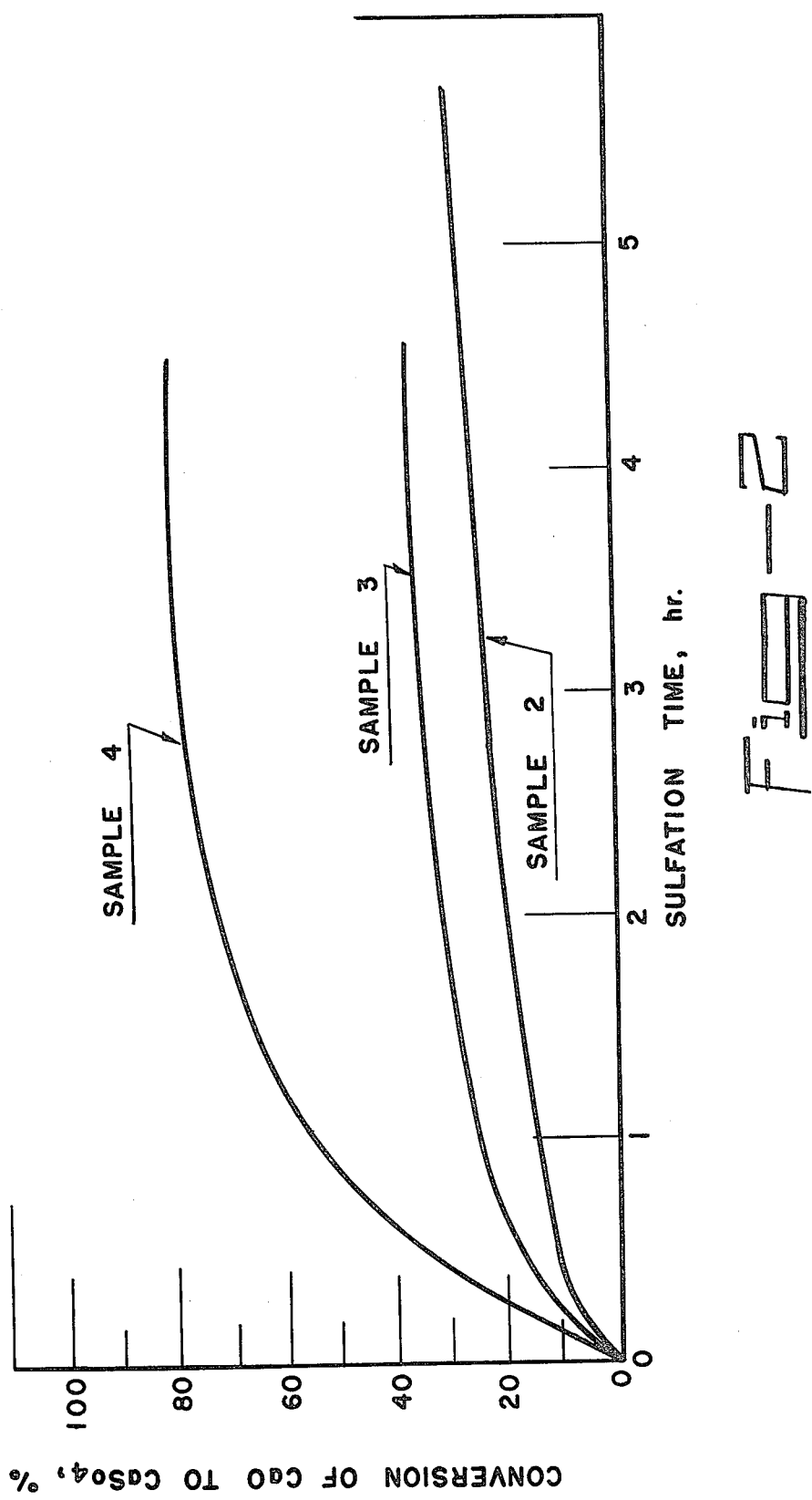
FIG. 2 is a graph showing the conversion of calcium oxide to calcium sulfate in alumina support materials that were heat-treated at different temperatures.

Referring now to FIG. 2 where the sulfation rate of the three heat-treated samples is shown as a percent conversion of calcium oxide to calcium sulfate. Each of the samples was exposed to a flow of simulated combustion gas at 900° C. containing by weight 0.3% $SO_2$ and 5% $O_2$ in nitrogen. It is seen from FIG. 2 that the sample 4 support material that was heat-treated to 1500° C. and included nearly all of its pore volume with pore diameters of 0.2 micrometer and more, showed a substantial and unexpected increase in sulfation rate over the other support materials with smaller pore diameters. Sample 3, with just a major portion of its pores over that diameter, exhibits marginal conversion rates and is considered to represent the lower limit of pore diameters and heat-treating conditions.

As an example of the regeneration of a supported sulfate, several samples of 6.6 weight % CaO in $\alpha Al_2O_3$ pellets were sulfated to near completion at 900° C. with a flow of 3% $SO_2$, 5% $O_2$ in $N_2$ gas for about 22 hours. Under similar exposures only about 50% of limestone or dolomite particles would be sulfated. On regeneration of these supported samples at 1100° C. in a fluidized bed with about 1 volume % reducing gas in nitrogen for 5 minutes it was found that most of the sulfate had converted to $CaO.Al_2O_3$ or $CaO.2Al_2O_3$. Under similar conditions only about 50% of the sulfate formed in limestone or dolomite can be regenerated to oxide. Table II reports the conversion from sulfate to oxide found for the several reductants used to regenerate the $CaSO_4$ supported on alumina.

TABLE II

| Reducing gas | % conversion to oxide |
|---|---|
| $H_2$ | 99.6 |
| CO | 97.5 |
| $CH_4$ | 80 |

On exposing other samples to various concentrations of $H_2$ gas in $N_2$ under similar conditions, the conversions reported in Table III were observed.

TABLE III

| $H_2$ gas Vol. % | Reaction time (min) | % conversion to oxide |
|---|---|---|
| 0.1 | 5 | 32 |
| 0.1 | 15 | 70 |
| 0.1 | 25 | 90 |
| 0.5 | 5 | 67 |
| 0.5 | 10 | 90 |
| 1.0 | 5 | 94 |
| 1.0 | 8 | 98 |
| 3 | 3 | 98 |

At various temperatures using 2.0% by volume $H_2$ gas in $N_2$ for regeneration, it was found that the following were formed: at 1100° to 1200° C. mostly calcium oxides (calcium oxide or calcium aluminate); at 1000° to 1100° C. a mixture of calcium oxides and calcium sulfide; at 900° to 1000° C. mostly calcium sulfide with a little calcium oxide; and at below 900° C. mostly calcium sulfide alone was produced.

In all of the samples regenerated it was found that the pellets remained intact and did not decrepitate in the manner previously observed for limestone and dolomite particles.

It will therefore be seen from the above that the present invention provides an improved method for removing sulfur dioxide gas from a fluidized-bed combustion process that does not employ materials such as bulk limestone and dolomite which suffer severe decrepitation within the combustion process and during subsequent regeneration. Furthermore, the method of the present invention permits almost complete regeneration of metal sorbents impregnated within refractory support materials. The invention also provides a method for preparing support materials with suitable porosity and pore diameters containing the metal oxide sorbents such that an unexpected improvement in sulfation rate can be obtained.

The embodiments of the invention in which an exclusive property or privilege is claimed are defined as follows:

1. In a fluidized-bed, coal-combustion process wherein particulate coal containing sulfur is burned to produce combustion gases at about 900° C containing at least 0.3% sulfur dioxide by weight and the sulfur dioxide is removed by reaction with an effective amount of a metal compound to react with the sulfur dioxide and form a metal sulfate, the improvement wherein said metal compound is calcium oxide impregnated at about 6 to 12% by weight within porous alumina having a major portion of its pore volume with pore diameters in excess of 0.2 micrometers.

2. The process of claim 1 wherein said porous alumina has more than 80 percent of its pore volume with pore diameters in excess of 0.2 micrometer.

3. The process of claim 1 wherein said calcium oxide is impregnated into particles of porous alumina by the method comprising
   heat-treating said alumina particles to a temperature in excess of 1200° C for a sufficient period to provide a major portion of the pore volume thereof with pore diameters in excess of 0.2 micrometer;
   contacting said alumina particles with a nitrate solution of calcium; and
   heating said alumina particles with impregnated nitrate solution to a temperature sufficient to decompose the calcium nitrate to form said calcium oxide impregnated within said support material.

4. The process of claim 3 wherein said alumina particles are heated to a temperature of about 1500° C. to provide more than 80% of the pore volume thereof with pore diameters in excess of 0.2 micrometer.

* * * * *